United States Patent
Davis, Jr.

[15] 3,654,841
[45] Apr. 11, 1972

[54] MACHINE FOR MAKING PLASTIC BAGS

[72] Inventor: Francis A. Davis, Jr., Lansdale, Pa.
[73] Assignee: Paramount Packaging Corporation, Chalfont, Pa.
[22] Filed: Oct. 20, 1970
[21] Appl. No.: 82,257

Related U.S. Application Data

[63] Continuation-in-part of Ser. No. 726,897, May 6, 1968, Pat. No. 3,534,665.

[52] U.S. Cl. ............................93/33 H, 93/8 R, 156/251, 156/344
[51] Int. Cl. ............................................B31b 1/14
[58] Field of Search ...............93/8, 33 H, 35 SB; 156/812, 156/515, 344, 251

[56] References Cited

UNITED STATES PATENTS

| | | | |
|---|---|---|---|
| 3,534,666 | 10/1970 | Maccherone | 93/35 SB |
| 3,470,795 | 10/1969 | Davis | 93/8 R |

*Primary Examiner*—Bernard Stickney
*Attorney*—Seidel, Gonda & Goldhammer

[57] ABSTRACT

A machine for making open-gusset bags from thermoplastic material is disclosed. Reciprocating blades are disposed within the gusset to open the gusset after a generally V-shaped notch is removed from the gusset and before the web is divided into bags by transverse welds.

10 Claims, 8 Drawing Figures

PATENTED APR 11 1972
3,654,841
SHEET 1 OF 4
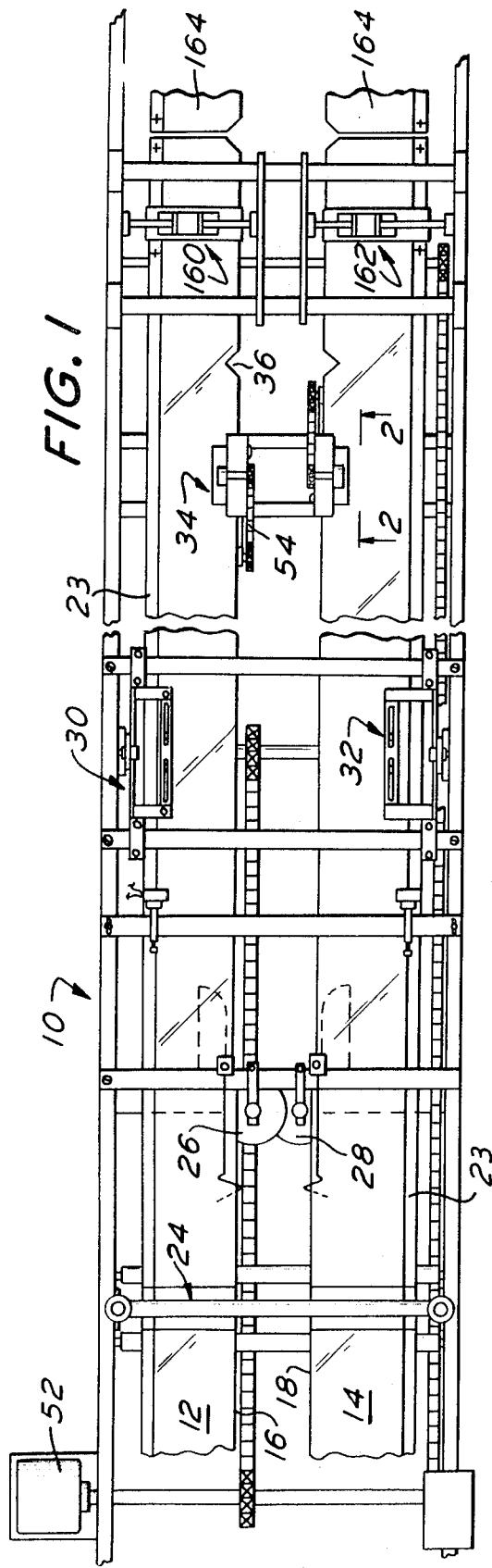
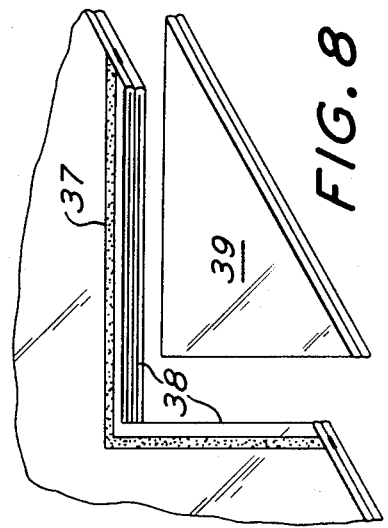
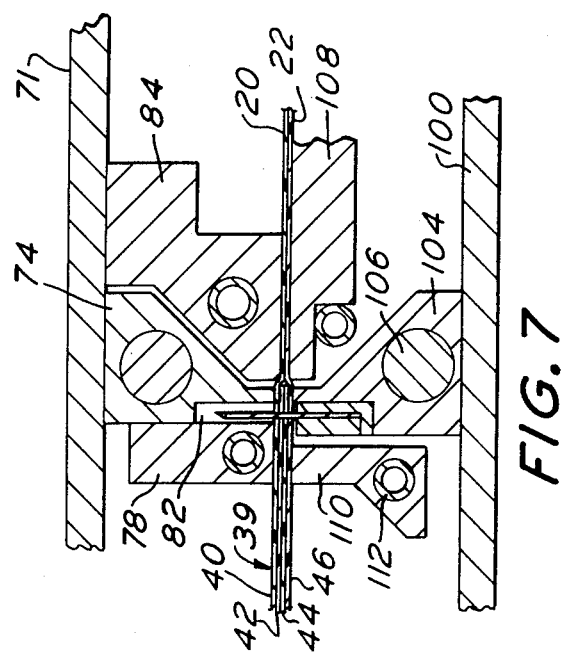
INVENTOR
FRANCIS A. DAVIS, JR.
BY
Seidel, Gonda & Goldhammer
ATTORNEYS

MACHINE FOR MAKING PLASTIC BAGS

This application is a continuation-in-part of my copending patent application Ser. No. 726,897 filed May 6, 1968, now U.S. Pat. No. 3,534,665, issued Oct. 20, 1970 and entitled Plastic Bag Forming Apparatus. The disclosure therein is incorporated herein by reference.

When a web of thermoplastic material is folded so that it can overlie itself and has a longitudinally extending fold line, there are two layers of material, namely the top layer and a bottom layer. When a gusset is formed along the fold line, in the gusset there will be four layers of overlapping material. When a notch is cut through the gusset and a weld provided parallel to the notch, the top two layers are welded together and the bottom two layers are welded together. The second and third layers are not welded together since they are coated with a heat-resistant material such as shellac, ink, etc. However, there is a tendency of the second and third layers to stick together along the weld.

When the bag is filled with merchandise, or opened by introducing air under pressure into the bag, some of the gussets do not fully open due to the sticking together of the second and third layers at the gusset. The apparatus of the present invention includes means for mechanically separating the second and third layers of the gusset immediately after the weld is formed along the notch. As a result thereof, the tendency of the gusset failing to open is substantially eliminated.

In the machine of the present invention, the cutting blades which cut the notch are parallel to but spaced from the surfaces which effect a weld along the notch. One of the surfaces which effects the weld along the notch is supported by a floating top platen for self-alignment and self-accommodation to one or more similarly supported pressure plates operatively associated with the other surface for effecting a weld along the notch.

A motor means is provided for moving the notch welding head toward and away from the bottom platen in a timed relationship with the movement of the web. That is, the notch welding head moves downwardly toward the bottom platen while the web is stationary. Movement of the notch welding head is structurally interrelated with mechanical elements which move the blades in the gusset toward and away from each other. As a result of this structural interrelationship, a separate actuator motor for movement of the blades is eliminated as well as the coordination or synchronization which would be required if the blades were provided with a separate motor.

It is an object of the present invention to provide a novel machine for making plastic bags having an open gusset.

It is another object of the present invention to provide a machine for making plastic bags which is structurally interrelated in a manner so as to provide reliable operation notwithstanding the delicate nature of the plastic materials being processed.

It is another object of the present invention to provide a machine for making plastic bags in a manner whereby notches are provided along gussets spaced from but parallel to a notch weld before the web is cut into individual bags.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a top plan view of the machine of the present invention.

FIG. 6 is an exploded sectional view of the notch welding means taken along the line 6—6 in FIG. 4.

FIG. 7 is a sectional view similar to FIG. 6 but showing the components in a closed disposition.

FIG. 8 is an exploded view showing the tab removed from the gusset portion of a web shown partially in perspective and on an enlarged scale.

Figure 2:
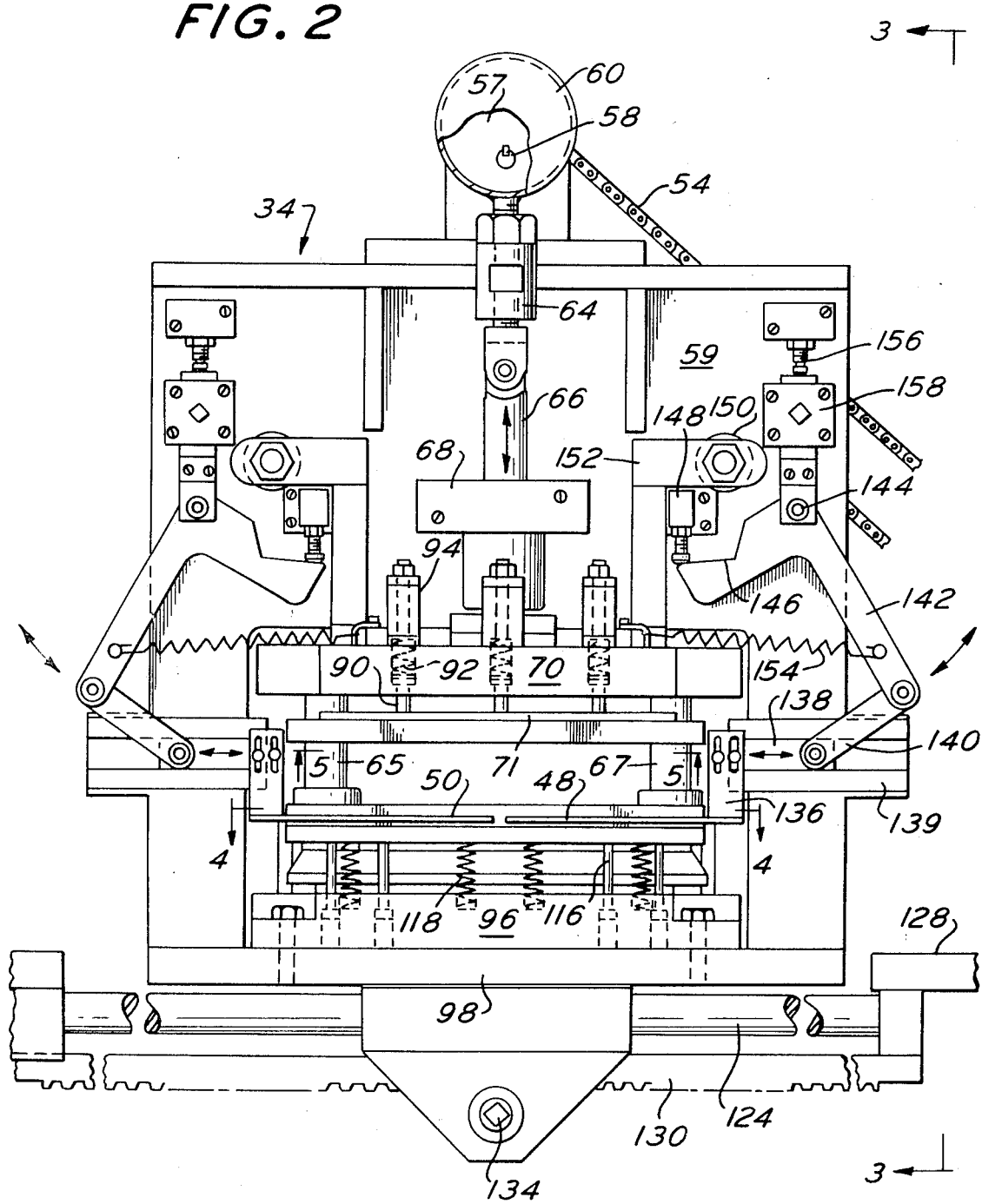
FIG. 2 is a sectional view taken along the line 2—2 in FIG. 1.

Referring to the drawing in detail, wherein like numerals indicate like elements, there is shown in FIG. 1 a machine designated generally as 10. The machine 10 is intended to have fed therethrough a pair of spaced parallel thermoplastic webs 12 and 14. The machine 10 has two parallel production lines, each defined by one of the webs. The webs 12 and 14 are processed in the same manner.

The web 12 is folded along fold line 16 so that the web overlies itself. Web 14 is similarly folded along line 18. Since each of the webs 12 and 14 are processed in the same manner, only web 12 will be described in detail hereinafter. It will be understood that corresponding structure is illustrated, at least in part, in conjunction with web 14. The web 12 is continuously unwound from large rolls and fed through a capstand take-up roll assembly 24. When forming fold line 16, the top layer 20 and the bottom layer 22 overlie one another so as to provide a protruding edge portion 23 on the bottom layer 22. Any conventional means is used to intermittently feed web 12 and operate the machine 10.

Along the fold line 16, there is provided a rotatable gusset plate 26 which forms a gusset along the fold line. A similar gusset plate 28 is provided for web 14. The gusset plates are of the type disclosed in U.S. Pat. No. 3,282,172.

The gusseted web 12 is then fed so that the protruding edge portion 23 may be provided with perforations or slits by means of the slitter 30. A similar slitter 32 is provided for web 14. The slitters may be of the type shown in U.S. Pat. No. 3,183,750. The provision of edge portion 23 is optional.

The intermittently fed web 12 is then processed by a notch welding means 34. The notch welding means 34 is adapted to cut notches 36 from the gusset at spaced points therealong. When forming the notches 36, the top two layers of the gusset are welded along weld line 37. Simultaneously, the bottom two layers of the gusset are welded along the weld line 37. As shown more clearly in FIG. 8, the weld line 37 is spaced from and parallel to the converging edges 38 which define the notch 36. When cutting the notch 36, there is produced a tap 39 which is discarded as scrap.

Figure 4:
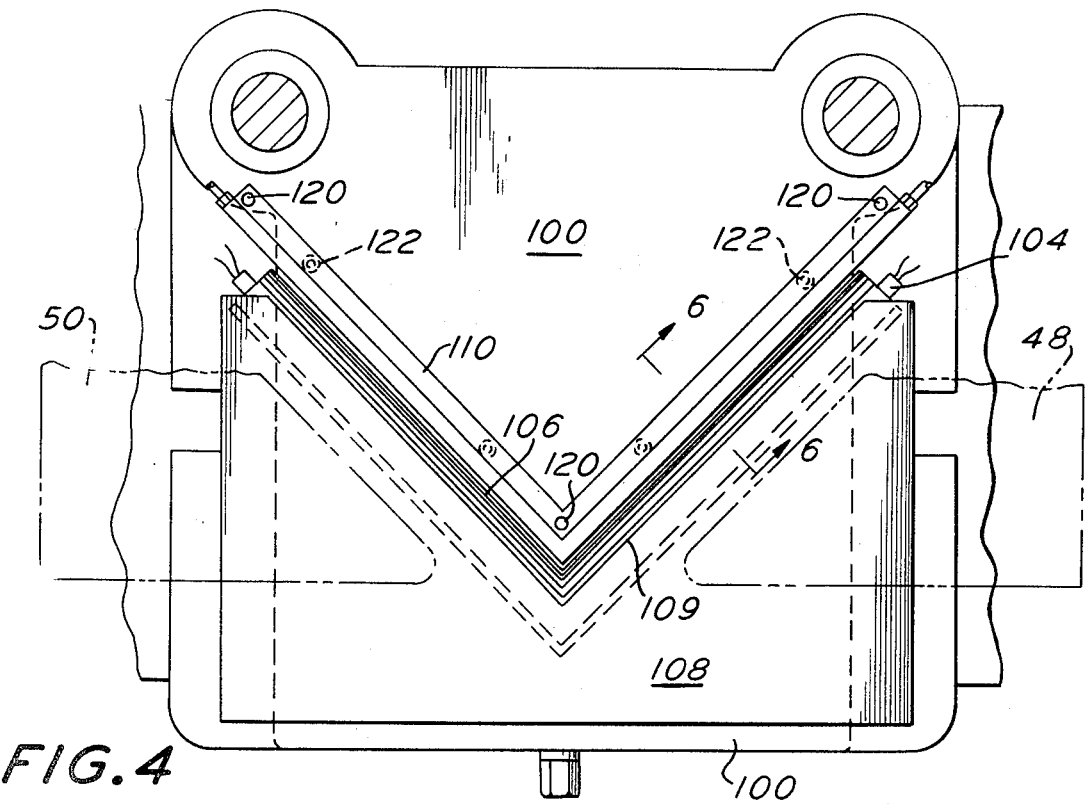
FIG. 4 is a view taken along the line 4—4 in FIG. 2.

The gusset portion of the top layer 20 is defined by layers 40 and 42 which weld together along weld line 37. The gusset portion of the bottom layer 22 is defined by the layers 44 and 46 which also are welded together along the weld line 37. The layers 42 and 44 tend to stick along the weld line and are prevented from being welded by means of a heat-resistant chemical such as shellac or ink applied to the surfaces of layers 42 and 44. In order to open the gusset along the juxtaposed surfaces of layers 42 and 44, there are provided a pair of blades 48 and 50 adapted to move toward and away from each other. See FIG. 2. Initially the blades 48 and 50 are spaced from one another, see FIG. 4, when the notch 36 is cut and the weld line 37 formed, as referred to above. Thereafter, the blades 48 and 50 are reciprocated towards each other to separate the layers 42 and 44 from each other along the weld line. At all times, the blades 48 and 50 lie in a horizontal plane and extend into the space between layers 42 and 44 at the gusset of web 12. The coating of heat-resistant chemical may be eliminated if the blades 48 and 50 move fast enough as soon as the welder means moves away from the web.

The webs 12 and 14 are intermittently fed through the machine 10 by means of a drive motor 52. The motor 52 is connected through a gear box, not shown, to drive a chain 54. Chain 54 extends around sprocket 56 on shaft 58. Shaft 58 is rotatably supported by suitable bearings on a frame 59 of the notch welding means 34. See FIGS. 2 and 3.

A ring 60 is rotatably supported by an eccentric on shaft 58. As shaft 58 rotates, the cooperation between the eccentric 57 and ring 60 causes threaded shaft 62 on said ring 60 to reciprocate up and down.

The shaft 62 is threadedly connected to an adjustable coupling 64. Coupling 64 is connected to an actuator rod 66 by means of a clevis. Rod 66 is guided for vertical reciprocal movement by a guide 68 supported by frame 59. The lower end of rod 66 is connected to a die head 70.

Figure 5:
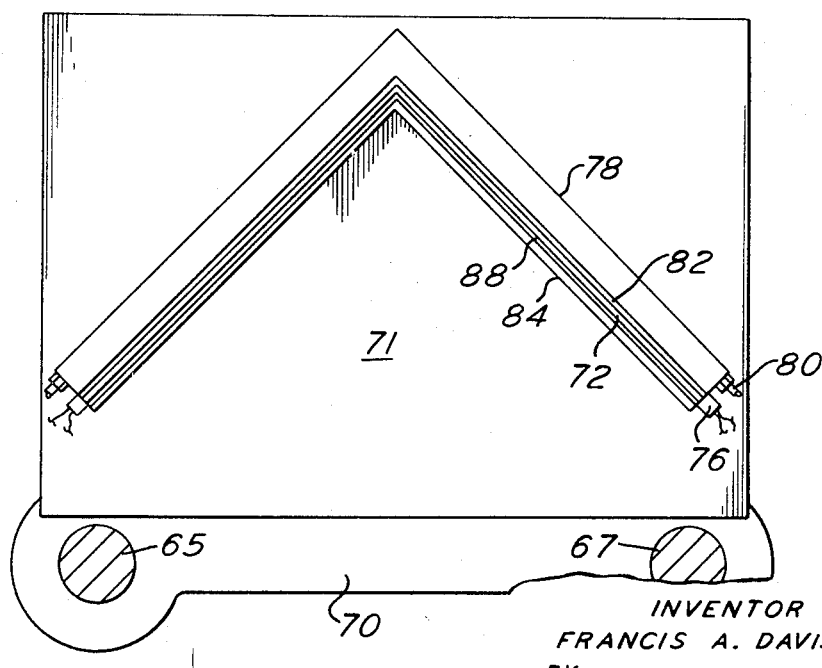
FIG. 5 is a view taken along the line 5—5 in FIG. 2.

The die head 70 is caused to move up and down with the movement of actuating rod 66 and is guided by rods 65 and 67. Die head 70 is provided with a top platen 71 movable therewith. The lower surface of platen 71 has secured thereto a V-shaped support member 74 having at its lower edge a V-shaped welding surface 72. See FIGS. 5 and 6. The heat to effect a weld by surface 72 is provided by the electrical heater cartridge 76 extending through a hole in support member 74.

A V-shaped member 78 having a coolant conduit 80 therethrough is supported from member 74 in any convenient manner so as to be spaced therefrom at the lower end thereof by the V-shaped gap 82. The purpose of gap 82 will be made clear hereinafter. A V-shaped coolant member 84 having a coolant conduit 86 is supported in any convenient manner from the top platen 71 but spaced from member 74 by the V-shaped gap 88. The purpose of gap 88 will be made clear hereinafter.

The top platen 71 has relative movement in a vertical direction with respect to the die head 70. Platen 71 is supported from the die head 70 by means of pins 90 having enlarged heads. The enlarged heads on pins 90 are received within guide holes in die head 70. Springs 92 in the guide holes bias the pins 90 to their lowermost position. The tension of springs 92 is adjustable by way of the adjusting devices 94.

A die base 96 is bolted to a flange 98 forming a part of the frame 59. See FIGS. 2 and 3. A bottom platen 100 is fixedly supported by the base 96. A blade support 102 is secured to the upper surface of platen 100 in any convenient manner. See FIG. 6.

The blade support 102 is generally V-shaped and is provided with an electrical heater cartridge 104. Support 102 releasably and adjustably supports a V-shaped blade 106 which will be heated by the cartridge 104. Support 102 is positioned in a location so that the blade 106 will enter the gap 82 as shown more clearly in the orientation of the elements shown in FIG. 7.

A first pressure plate 108 is supported by the bottom platen 100 spaced from a second pressure plate 110. Pressure plate 110 is generally V-shaped and spaced from a V-shaped edge 109 on plate 108. See FIG. 4. The gap between plate 110 and edge 109 is sufficient in size so that the blade 106 may extend therethrough. Pressure plate 108 is cooled by coolant conduit 114 and pressure plate 110 is cooled by coolant conduit 112.

Pressure plates 108 and 110 are independently supported for movement toward and away from the bottom platen 100. Movement of plate 108 is guided by pins 116. Springs 118 extend between the bottom platen 100 and the pressure plate 108 biasing the latter upwardly. See FIGS. 2 and 3. Similar pins 120 and springs 122 are provided for the pressure plate 110. Pressure plate 108 is positioned opposite the member 84. Pressure plate 110 is positioned opposite the member 78. See FIGS. 6 and 7.

A pair of guide rods 124 and 126 are suitably supported from depending brackets on the frame support 128. See FIGS. 2 and 3. A rack 130 is fixedly secured to the last mentioned brackets. A pinion 132 is rotatably supported by depending ears on the bottom surface of flange 98. The pinion shaft terminates in a wrench head 134. Rotation of wrench head 134 by a suitable tool will cause the entire notch welder means 34 to be adjusted in the direction of movement of the web 12 so that the location of the notches 36 may be adjusted as desired depending upon the size of the bag to be manufactured.

The means for moving the blades 48 and 50 toward and away from each other in synchronization with the cutting of the notches 36 is identical. Hence, only the means associated with blade 48 will be described in detail.

Figure 3:
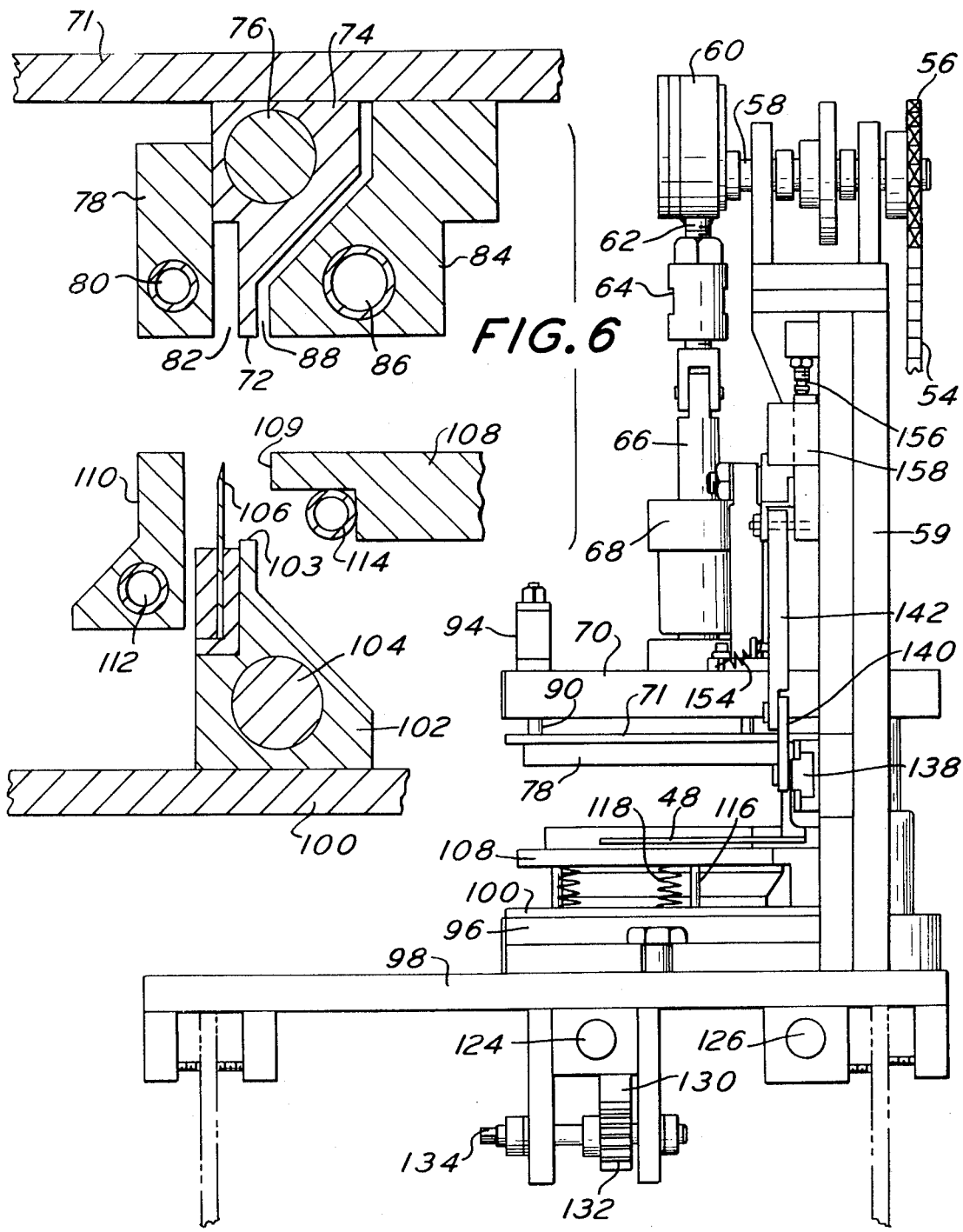
FIG. 3 is an end view taken along the line 3—3 in FIG. 2.

Blade 48 is connected to a bracket 136 as shown more clearly in FIG. 2. The bracket 136 is vertically adjustable and connected to a horizontally disposed slide 138. Slide 138 is reciprocably supported by housing 139 on frame 59. One end of slide 138 is pivotably connected to a link 140.

The other end of line 140 is pivotably connected to one end of a bell crank 142. The bell crank 142 is pivotably mounted by pivot pin 144. The other leg of the bell crank 142 is provided with a cam surface 146 having a V-shaped notch.

Said other leg of the bell crank 142 is adapted to contact a limit stop 148 which is adjustable. Limit stop 148 is supported by the frame 59. A cam roller 150 is adapted to cooperate with said cam surface 146 and pivot the bell crank 142. The cam roller 150 is supported by a bracket 152 mounted on the die head 70. The blade 48 is biased to the position shown in FIG. 2 by means of a spring 154 extending between the die head 70 and the first mentioned leg of the bell crank 142.

The vertical disposition of the pivot pin 144 may be selectively adjusted by means of device 156 which supports the pivot pin 144 and extends through a guide 158 on the frame 59.

Referring to FIG. 1, there is provided a device 160 for transversely cutting the web 12 at the apex of the notches 36 and simultaneously providing a seam weld adjacent to but parallel to the transverse cut thereby providing bags 164. A similar device 162 is provided for the web 14. Devices 160 and 162 are synchronized with the remainder of the machine 10. When the transverse cut effected by devices 160 and 162 is slightly misaligned with respect to the apex of the notches 36, notch welder means 34 may be adjusted in the direction of travel of the webs to properly position the location of the notches 36.

The operation of machine 10 is as follows:

Web 12 is intermittently fed by motor 52. Each time the movement of the web 12 stops, the slitter 30 will provide slits in the edge portion 23, the notch welder means 34 will provide a notch 36 with a notch weld 37 adjacent thereto, and the device 160 will provide a transverse cut and seam weld adjacent thereto.

In order to cut the notch 36 and effect the weld 37, the relevant elements of the means 34 are in a position shown in FIGS. 2 and 6. As shaft 58 rotates, the cam 59 rotates therewith and causes the ring 60 to move downwardly. As the ring 60 moves downwardly, the top platen 71 is caused to move downwardly.

As the top platen 71 moves downwardly, it moves the welding surface 72 toward the gusset on the web 12. Also, after a time delay, cam roller 150 will contact the surface 146 and move the blade 48 to the right in FIG. 2 so as to be out of the way of the supports on the lower surface of platen 71.

The stationary web 12 will be lying on the upper surface of plates 108 and 110, which is slightly above the cutting edge of the blade 106. As the die head 70 with the top platen 71 continue to descend, the juxtaposed surfaces on member 78 and plate 110 will accommodate to each other with the four layers of the gusset therebetween. See FIG. 7. Similarly, the juxtaposed surfaces on member 84 and plate 108 will accommodate to each other with the top layer 20 and bottom layer 24 therebetween as shown in FIG. 7. As the plates 108 and 110 are forced downwardly, the blade 106 cuts upwardly through the four layers of the gusset to provide notch 36 and produce the tap 39. It will be noted that the welding surfaces 72 and 103 are adjacent and parallel to the cutting blade 102 so as to effect the weld 37.

The spring support for plate 108 permits it to be self-accommodating with respect to member 84 independent on the self-accommodation between pressure plate 110 and member 78 which must accommodate a different number of thicknesses of the material of the web 12. The zone of the notch weld 37 is restricted to the surface area of welding surfaces 72 and 103 by the gaps 82 and 88. In addition, each of elements 78, 84, 108 and 110 are cooled by a coolant flowing through the conduits associated with those elements. In this manner, a narrow notch weld 37 may be attained without stretching or wrinkling the web material.

Subsequent to 180° of rotation of the ring 60 from the position shown in FIG. 2, the die head 70 returns to the position shown in FIG. 2. As the die head 70 moves upwardly, the spring 154 contracts thereby moving the blade 48 inwardly toward the blade 50 at a rate corresponding to the rate at which head 70 moves upwardly. Such inward movement of the blade 48 continues at a controlled rate corresponding to the upward movement of head 70 until cam roller 150 no longer contacts cam surface 146. Thereafter, the inward movement of blade 48 is substantially faster until surface 146 contacts limit stop 148. As the blades 48 and 50 move inwardly toward one another, they separate and remove any tendency of the layers 42 and 44 sticking to one another. After the blades 48 and 50 separate layers 42 and 44, the blades remain in their closed disposition in the gusset as forming devices as the web 12 moves forward. The blades as forming devices prevent the cut edges 38 from getting caught on any element of welder means 34 and also maintain the welded edges upward from one another for a sufficient period of time so that layers 42 and 44 will not reseal when they contact one another.

In addition to the above, and while the web 12 is stationary, the device 160 transversely cuts the web 12 at the apex of the notches 36 and effects a seam weld adjacent but spaced from and parallel to the transverse cuts. As will be apparent to those skilled in the art, the above sequence of events happens very quickly over a period of time less than about 1 second. The present invention may be used to make bags with double walls, bags without a gusset, etc. With webs which do not have a gusset, the web will overlie and be supported by blades 48 and 50.

The present invention may be embodied in other specific forms without departing from the spirit or essential attributes thereof and, accordingly, reference should be made to the appended claims, rather than to the foregoing specification as indicating the scope of the invention.

I claim:

1. A machine for making bags from thermoplastic material comprising means for intermittently feeding a web having a top and bottom layer connected along a longitudinal side edge by a gusset, a notch cutter-welder means for cutting a V-shaped notch in the gusset while the web is stationary and simultaneously welding a seam adjacent and parallel but spaced from the notch, said seam weld joining the top tow layers of the gusset together and also joining the bottom two layers of the gusset together, said cutter-welder means including a top platen mounted for movement toward and away from a bottom platen, at least one pressure plate supported by the bottom platen and spring-biased toward the top platen for cooperation therewith in embracing the web therebetween, and means downstream from said cutter-welder means for transversely cutting the stationary web at the apex of the notch to form individual bags and simultaneously seam weld the cut edge adjacent but spaced from the cut edge.

2. A machine in accordance with claim 1 including a separator means having a pair of blades disposed in the gusset between the middle layers of the gusset, and actuator means for selectively moving the blades along the gusset toward and away from each other after the V-shaped notch has been cut and the edges of the notch have been provided with said seam weld.

3. A machine in accordance with claim 2 wherein said means for selectively moving the blades is coupled to said top platen so that downward movement of the top platen results in movement of the plates away from each other, and a lost motion connection between said top platen and the means for moving the blades.

4. A machine in accordance with claim 1 including means mounting said notch-cutter-welder means for horizontal movement toward and away from said means for transversely cutting the web.

5. The machine in accordance with claim 1 wherein said cutter-welder means includes a V-shaped cutting blade mounted on the bottom platen, said bottom platen being stationary, said pressure plate being on one side of the blade, a second pressure plate on the other side of the blade, said second pressure plate being spring-biased toward the top platen for cooperation with the top platen in embracing the web therebetween, said first and second pressure plates being independently spring-biased so that they may accommodate the different thicknesses of the web.

6. A machine in accordance with claim 1 wherein said cutter-welder means includes a die head, said top platen being adjustably supported by said die head and spring-biased downwardly towards the bottom platen, said top platen having a heated V-shaped welding surface and a cooled V-shaped member adjacent to the surface, but spaced therefrom by a gap into which a cutting blade on the bottom platen extends in the closed disposition of the platens.

7. A notch-cutter-welder for use in a machine for making bags from thermoplastic material comprising means for cutting a V-shaped notch at a fold line in a web while the web is stationary and simultaneously welding a seam adjacent and parallel but spaced from the notch so as to join two layers of the web together, including a top platen mounted for movement toward and away from the bottom platen, at least one pressure plate supported by the bottom platen and spring-biased toward the top platen for cooperation therewith in embracing the web therebetween, and said means including a V-shaped cutting blade on one of said platens and the other platen having a V-shaped gap into which the blade extends in a closed disposition of the platens.

8. A welder in accordance with claim 7 including a separator means having a pair of blades to be disposed in a gusset at said fold line with the middle layers of the gusset, and actuator means for selectively moving the blades along the gusset toward and away from each other after the V-shaped notch has been cut and the edges of the notch have been provided with said seam weld.

9. A welder in accordance with claim 8 including spring means biasing the blades toward each other, and means coupling said actuator means to motor means for moving the top platen.

10. A welder in accordance with claim 7 wherein said blade is between said pressure plate and a second pressure plate disposed at substantially the same elevation as said first-mentioned pressure plate, and means associated with each pressure plate for cooling the same.

* * * * *